UNITED STATES PATENT OFFICE.

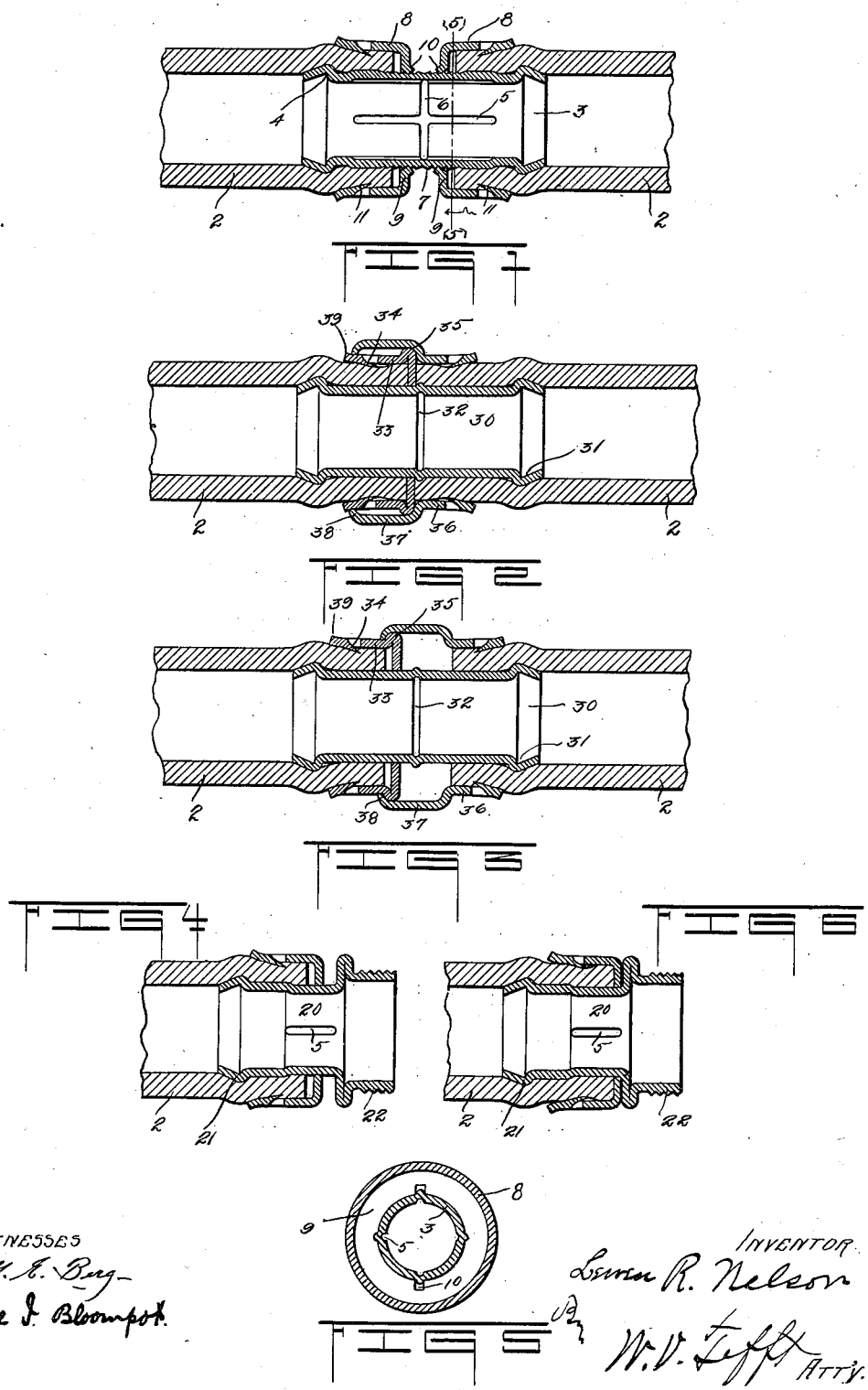

LEWEN R. NELSON, OF PEORIA, ILLINOIS.

HOSE COUPLING AND MENDER.

1,179,552.   Specification of Letters Patent.   Patented Apr. 18, 1916.

Application filed August 4, 1913. Serial No. 782,888.

*To all whom it may concern:*

Be it known that I, LEWEN R. NELSON, a citizen of the United States, residing at Peoria, in the county of Peoria and State of Illinois, have invented certain new and useful Improvements in Hose Couplings and Menders, of which the following is a specification.

My invention relates to hose menders and couplers.

My object is to provide a mender and coupler of very simple construction; to make it of such light material that it will involve small cost and to make a mender and coupler that may be applied by the use of the hands only, thereby excluding the necessity of a hammer or the like to unite parts.

My invention consists in the combination of a tubular member provided with enlarged ends adapted for use as a mender or one enlarged end for use as a coupler; ring or rings provided with inturned flanges adapted to meet the walls and to be supported upon the tubular members. The device in use as a mender will be provided with two of such rings oppositely faced or disposed, their open ends adapted to receive the ends of the hose; the provision of impaling points or barbs struck below the inner surfaces of said rings extending rearwardly from the open end of said rings adapts them to engage the ends of hose inserted into said rings.

My invention further consists in the arrangement of ribs upon the tubular member in serrating of longitudinal rib portion of the ring to form a stop, the striking rearwardly from the inturned flanges of the rings of drags or dogs adapted to engage serrations on the tube and to details of construction hereafter more particularly set out.

In the drawings Figure 1 is a longitudinal sectional view of a hose mender. Fig. 2 is a longitudinal sectional view of a modified form of my hose mender. Fig. 3 is the same character of view and discloses the same subject matter as Fig. 2 except that the parts are shown in different positions relatively. Fig. 4 is a longitudinal sectional view of my device applied as a coupler. Fig. 5 is a cross section of Fig. 1 viewed from the direction indicated by the pointing of the arrow. Fig. 6, shows same as Fig. 4, except that the parts are in different position.

I have been engaged in the manufacture of hose couplers and hose menders for several years and have found that this class of goods must be manufactured at small cost in order to make them salable, and to that end I have had in mind constantly the cheapness in the production, keeping in mind of course the fitness of the articles. Also it has been necessary to produce these articles in form that make their application to the hose very simple and while I have in the course of my business very materially improved the earlier art in respects named, I have never heretofore developed articles possessing the characteristics of simplicity and cheapness that I have attained in the structure of this application.

Referring to the drawings—2 in all instances refers to hose; 3 refers to tubular member of hose mender. These tubular members in practice by me are made of sheet metal.

4 are enlargements or expansions at the ends of said tubular members designed to expand the hose for impingement purposes; 5 are ribs extending longitudinally of the tube in numbers to suit the application desired, the purpose of said ribs being to prevent the hose from turning with relation to tube members; 6 is a circumferential rib designed as a stop or centering point with relation to ring members on the tube.

7 are raised or roughed parts upon ribs 5 serviceable for purposes hereafter indicated.

8 are ring members disposed upon the tube and are provided with inturned flanges 9 meeting the tube. Members 10 are catches or short dogs struck out from the body of the flange and at their edges the openings purposed to provide clearance with relation to ribs 5 and a stop against the turning of rings upon the tube, and the dogs serving the further purpose of a drag upon the roughed surfaces of ribs 5 and a stop against the rearward movement thereof. Ring members 8 normally are implacements against rib 6 and are designed in practice to be moved respectively toward the ends of the tubular member for the purpose of impinging the hose, as will later be explained.

11 are impaling points or barbs in numbers to suit struck in from the body of the ring in a manner to dispose the points toward the inturned flanges 9, the purpose of such barbs being to draw the rings 8 forward into the impingement of the hose upon the enlarged end of the tube.

In Fig. 4 is illustrated the application of the same mechanical device and principle as disclosed in Fig. 1. In this figure 20 is a tubular member having an enlargement 21 at one end and at the other end is provided a screw threaded member 22 adapted to receive a hose nozzle or another section of hose. This structure is known as a hose coupler.

In Figs. 2 and 3 I have shown a modified form of my device. In this structure 30 is a tubular member, 31 enlarged spigot ends, 32 a circumferential rib, and there may be provided in this structure longitudinal ribs the same as disclosed in Fig. 1. 33 is a ring member provided with impaling points 34 and the inturned flange 35, this ring portion being ribbed as at 35. 36 is a ring portion provided with impaling points; 37 is an enlargement of ring portion 36 adapted to bear over ring 33, said enlarged ring portion being turned down at its rear end as at 38 and to engage the outwardly flanged portion 39 of ring 33. This structure provides for support of one coupler ring upon the other and for the movement of said rings relatively lengthwise.

In applying the mender disclosed in Fig. 1, the hose is pushed over the spigot ends and caused to enter rings 8 until they touch the wall of flange 10; then by pulling the hose outwardly they will be engaged by impaling points 11 and the rings will be drawn toward the enlargement at the end of the tube causing relative impingement between said enlargement and the inner surface of the tube thereby securing the hose permanently in place.

In practice I may or may not utilize the roughed feature of the longitudinal ribs, as generally such lock against return of the ring members is not necessary; however, I may find it advisable to use such a structure to some extent. The manner of applying my improvements for use in connection with coupler is the same as with the mender just above described.

The operation of the device disclosed in Figs. 2 and 3 is as follows:—The rings 33 and 36 are disposed relatively and upon the tube as shown in Fig. 1 initially; the hose is then pushed over the ends of the tubes and enter the ring members; the hose is then pulled outwardly, the impaling points engaging the hose and causing the ring members to be drawn outwardly until the hose is impinged, the position of the parts being shown in Fig. 3.

The modification disclosed in Figs. 2 and 3 is merely as to form, the principle being the same. The object attained in this modified form of structure is to do away with the space between the ring members that results from their being moved to interlock the hose upon the tube. This feature may be an advantage under some circumstances.

In all the figures of the drawings, I have shown a slight outward taper of the ring members and it is my belief that in practice this form may be desirable. Also have shown in all figures a slight out turn at the extreme ends of said ring members and it is my belief that this is the proper structure; however, in both instances named, I do not wish to be confined to the particular structure disclosed in this respect, as it may develop that a perfectly straight walled ring member may be employed with reasonably good results.

Hose couplers and menders heretofore marketed embodying separate clamped fingers adapted to be pounded down upon the hose are somewhat objectionable because of the interior surface or jagged surface presented, and besides the separation of the fingers mitigated somewhat against the strength of the connection. In the device presented here there is the advantage of the ring presenting a smooth un-interrupted surface and edge. Furthermore, in making the rings in a continuous band, permits the use of thin light material; whereas in the use of divided fingers for clamping means, it would not be practicable to use such light metal, as the fingers must have some consistency and strength.

In the disclosure herein, what I have designated as impaling points are shown struck in from the body of the ring and it is obvious that when the rings are made of light metal, the impaling points will be somewhat elastic, so that when the hose is inserted they will spring upwardly, thus offering slight obstruction to its entrance and when the hose is drawn outwardly to carry the ring into impingement with the enlarged end, these points will readily penetrate the hose. In practice, it is not absolutely necessary that these impaling points shall be elastic, but I prefer such construction.

I am seeking in this application the production of cheap menders and couplers that are capable of union with hose without the aid of tools, and generally of course to such necessary characteristics of the device that appear, but I do not wish to be confined to the exact form as disclosed in this application but claim all forms of embodiment of my invention that fall legitimately within the principle thereof.

What I claim is:—

1. A hose attachment comprising a central core having enlargements at its ends, a ring slidable on said core between said enlargements and having a cylindrical flange together with backwardly sloping spur teeth projecting inwardly from said flange.

2. A hose attachment comprising a central core having enlargements at its ends and a rib at its center, a ring slidable on said core between the central rib and one end enlargement, a cylindrical flange on said ring and means on said flange to retain a hose end seated between said flange and said core.

3. In a hose attachment, a central core, a ring slidable along but keyed to said core, and impaling prongs carried by said ring for engagement with the end of a hose.

4. In a hose attachment, a central core, a ring slidable along said core but non-rotatable with respect thereto and means for binding a hose end between said ring and said core, said means including impaling prongs for penetrating the end of a hose.

5. In a hose attachment, a central core having enlargements at its ends, a centrally disposed annular rib and a longitudinally disposed rib.

6. In a hose attachment, a central core having enlargements at its ends, a ring slidable on said core between said enlargements, said ring having an annular rib and a cylindrical flange having an annular depression therein and backwardly and inwardly directed impaling points on said flange, another ring having an annular flange seated in said annular depression, an enlargement around said rib and a smaller cylindrical flange provided with backward sloping impaling teeth, whereby when two hose ends are forced over said core and under said cylindrical flanges in opposite directions, the said hose ends are bound and held between said flanges and said core to form a hose coupling.

7. In a hose attachment, a central core having enlargements, a ring slidable on said core between the enlargements and having a cylindrical flange carrying inwardly directed impaling points, another ring fastened over said first mentioned ring but having a limited movement thereon, a cylindrical flange having inwardly directed impaling points on said second ring, whereby two hose ends may be forced into the annular space between said core and said flanges and will thereafter be tightly held therein by said impaling points.

8. In an apparatus of the class described, a core having enlargements, a ring slidable on said core between said enlargements but non-rotatable thereon, a cylindrical flange on said ring forming with said core an annular space for the reception of a hose end, and means on the flange to bind the hose in said space, said means penetrating the end of the hose.

9. A hose attachment comprising a tubular core for insertion within the end of a hose, the end of the core being enlarged, a ring slidable on said core and provided with a cylindrical flange flared at its outer end, said flange forming with the core an annular recess for the reception of the hose end, and means carried by the flange for penetrating the hose end.

In testimony whereof I affix my signature in presence of two witnesses.

LEWEN R. NELSON.

Witnesses:
J. E. DAGER,
W. V. TEFFT.